Patented Nov. 14, 1933

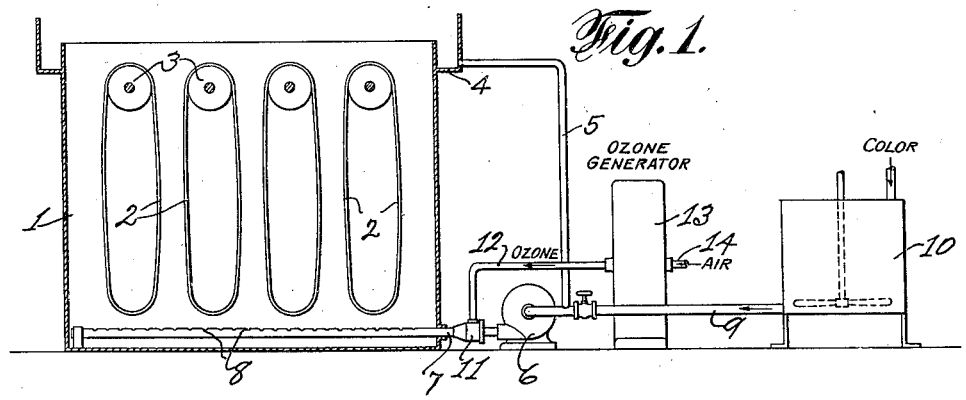
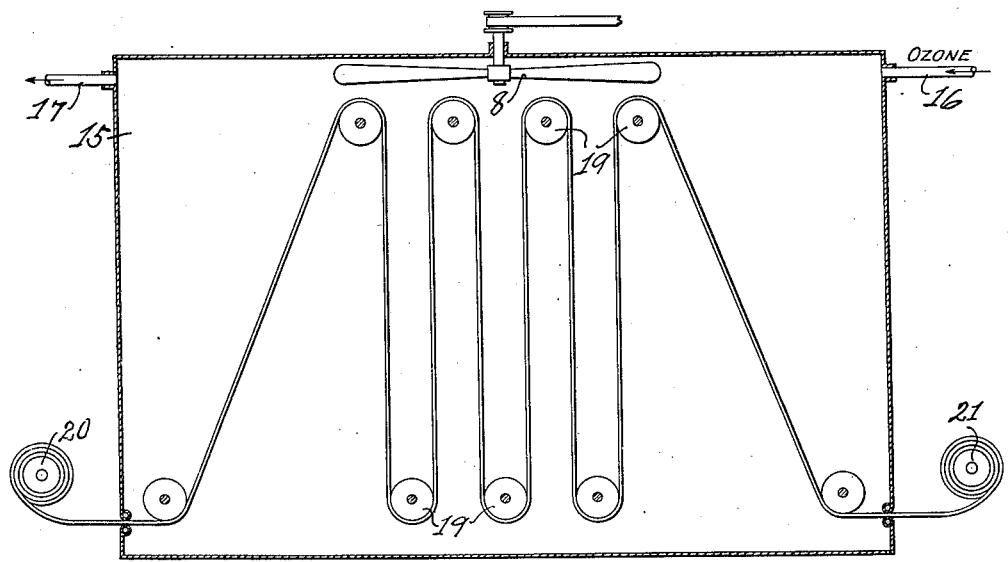

1,934,956

UNITED STATES PATENT OFFICE 1,934,956

PROCESS FOR DYEING GOODS

Justin F. Wait, Bronx, N. Y.

Application December 19, 1928
Serial No. 326,947

20 Claims. (Cl. 8—5)

This invention relates to the application of a dyestuff or color to a fabric or other porous material. The manner of fastening or attaching the small color particles to the surface with its minute pores is hereby improved.

Where light tints of colors are to be applied to so-called white cloth or other porous surfaces, considerable difficulty is experienced in producing a surface which will absorb the color and produce level dyeing. Likewise, it is difficult to remove and keep away discoloring impurities from such surface.

By means of this invention level dyeing is easily accomplished and it is possible to have lightly colored and deeply colored portions on adjacent portions of the same goods with a resulting contrast which is pleasing to the eye. It is thus possible to delicately adjust shades and intensities to give color effects, otherwise unattainable, or which can be obtained only at some expense or with the loss of some other desired factor.

I have found that if organic impurities contained in the pores of material are altered or destroyed by superoxidation with a reagent which leaves no residium (such as ozone which reverts back to oxygen) the pores are thereby rendered better adapted for the coloring of the surface of the porous material. By superoxidation herein is meant oxidation that takes place very quickly and mainly at the surface of the material. To make such treatment fully effective, there should be only a short interval of time, say ordinarily less than one hour, between the time of the superoxidation treatment and the application of color. If the superoxidation is aided by wetting, it is usually preferable to use the same wetting agent both for oxidation and coloring, thus insuring protection of the pores from contamination or plugging by foreign material.

An important factor of the invention is superoxidation with a reagent which will virtually disappear or vanish after reacting. I have found that ozone may be used for this purpose. It reacts with many organic colors and organic diluents used therewith and also with a few inorganic colors. This superoxidation also has desirable effects on many dyestuffs which appear to undergo chemical change.

The superoxidation appears to increase the amount of color absorbing surface by destroying or altering the structure of matter on the surface of the porous material and causing irregularities of the surface giving an increased surface area to absorb color. While I do not limit myself to this or other explanations or speculations or theories contained herein, I state that I believe that such superoxidation which is considered as quick and mainly at the surface results in improvements not otherwise obtainable. The extent of the oxidation obtainable by the steps described herein is controllable and the usual deterioration, dulling or other undesirable effect is not realized but though otherwise occurring is offset by marked improvement.

The dyestuff itself may in this way be benefited by the use of ozone especially in the presence of water. Without binding myself to any particular theory as to the exact way by which it acts, I suggest that it may possibly be explained as a very quick and limited action which I consider as a superoxidizing effect on byproducts which are formed or occur during the manufacture of the dyestuff or during its application. By destroying or altering the byproducts the "dullness" of the color becomes less and as a consequence the realized strength of the dye is sometimes increased.

The "fastness" of the dye is also improved in some instances by my process. This is probably due in part to the removal of organic matter in the submicroscopic pores of the fabric and possibly to some extent to the destruction or alteration of impurities which would be absorbed preferentially or simultaneously with the color. It is likely that the "fastness" is further improved by the chemical rearrangement brought about by the resulting greater amount of oxygen contained in the color.

Many dyestuffs, such as some "vat" dyes owe their color to an oxidation process. In its application or manufacture, the dyestuff is treated, for example, with lead peroxide or the oxygen contained in air. In the case of such colors, the superoxidation may serve to "complete" the oxidation to a greater degree, thus further converting at least a portion of the surface molecules of the color and yielding a more intense color and a greater brilliancy. If this is not done, the insufficiently oxidized color is really an impurity, producing undesirable color effect and perhaps being fugitive and lacking in "fastness."

The superoxidation as with ozone may be applied after the color is affixed, especially where there is a contrast of dark and light shades as in the so-called printed goods. It may be used either for pretreating the goods before applying the dye (or color) or as a posttreatment for bringing out its brilliancy after the application of the color. It is sometimes advisable to use it both for pretreatment and for posttreatment.

I have found that treatment with ozone at a temperature of between 135° F. and 185° F., or about 170° F., gives excellent results with many porous materials, especially fabrics. It is sometimes advantageous if the color is also applied in solution or suspension in a warm liquid as at a temperature of about 100° F., more or less. A treatment for not more than about thirty minutes is sufficient with most fabrics. Under this warm condition the organic matter causing odor so common in many applied colors is even more easily attacked by superoxidation so that the final colored and cool surface will no longer yield a discharge which would be noticeable. The prevention of excessive emission of the odor from colored goods is thus insured by the use of ozone whether the odor be due to or associated with the color itself or organic impurities occurring with the color as finally deposited. It is recognized that it is generally considered that cotton and cotton containing or cotton like substance as above mentioned are materially damaged by ozone however the methods described herein have been found usable for the indicated purposes and without such damage as has previously been indicated.

The process may be used both for ordinary dyeing or for printing as with dyestuffs on cotton goods or for fabric or other goods containing cotton or the like, or for the coating of slightly colored material with color alone, or mixed with organic oils. In the latter case, ozone may also be used to fix the color or the oils, or both, and to remove or alter organic impurities, within the oils or the applied coating, which would influence the color or cause odor. While the process is intended primarily when a color of organic origin is to be used, it may also be applied to many colors having an inorganic base, especially those which comprise organic liquids or contain impurities as a result of their manufacture or application.

In some cases where a portion of the material is to be heavily colored as in darkly printed fabrics, I have found that it is advantageous to apply the dark color before oxidation. By so doing, the "printed" surfaces require a less amount of color and the oxidizing agent reacts to brighten unprinted portions and even adds to the brilliancy of the applied color, either by contrast or by removing impurities. The oxidation treatment is preferably within about one hour after the color has been applied. Where a lengthy time period is allowed the results are generally unsatisfactory.

To give a brilliant finish to the colored surface, I use mechanical and chemical means to enlarge the surface receiving the color and also to enlarge the area visible to the eye. Mechanical motion of the porous material including flexure, especially coupled with a moving fluid or brushing the surface, assists in producing the desired result. Likewise, an acid treatment, especially if preceded by a slightly alkaline treatment, is instrumental in producing a condition which will result in brightening color or in yielding bright and level dyeing and I feel that this is due in part to a loosening of portions of material such as fibre especially when flexure of the fibres is utilized. The acid further assists in adsorption of the color in the pores. Colors such as acid fast violet are best absorbed by a surface recently treated with a weak acid.

Ozone, which is an active oxidizing agent can be conveniently manufactured by passing air through an electrical discharge and small amounts of an oxide of nitrogen, which is aciduous material, will also be produced, especially if the air contains moisture and if sparks occur with the brush discharge that is required for high grade ozone. This method of producing ozone therefore facilitates the operation of my invention.

The operation may be further facilitated by the presence of small amounts of salts of fatty acids. For example, if a fabric is wetted with water of a concentration of less than ½% of sodium oleate by weight during treatment with ozone in the manner generally described herein the reaction is stimulated and a better result obtained with many fabrics. This is true of many instances where a light "tint" of feeble dyeing effect is desired, a strength of about 1/20% or less by weight of color being satisfactory for producing the color desired. Vat dyes or those with a di- or triphenylmethane base are usable to give light tints.

To insure a correct shade, it is quite essential that the apparatus used be substantially free from parts which may be acted upon by the ozone, the color, and other reagents which might be used. For example, a small iron part would impart a reddish or brownish hue and brass part a greenish hue. To this end, I have found it desirable to use a "non-corrosive" container constructed without an appreciable amount of exposed surface of such parts of materials that would be corroded and possibly yield "streaks" of undesired colors and shades. I have found cypress and nickel and nickel-containing alloys satisfactory for most conditions as compared with the ordinary dye vat with the usual bronze or brass and even iron parts. A small degree of corrosion of such parts has only a negligible effect in ordinary dyeing, but with this more sensitive process using ozone and acidic and motion conditions corrosive materials must be eliminated.

In applying ozone to the surfaces of the material to be treated, it is necessary that the distribution be substantially uniform over the surfaces to be treated. This may be done by dissolving about one part by weight of ozone in two million parts of water and contacting the solution with the surface within about one minute, before the ozone is lost by reverting to oxygen. The distribution may also be brought about by bubbling an ozone-gas mixture through a liquid in which the material is suspended, this method preventing ozone decomposition occurring by some means of indirect application. Satisfactory results are obtained if heat is added while the ozone-gas mixture is in contact.

Uniform distribution of a color containing liquid moving with respect to the material to be treated insures level dyeing. By keeping the color at high dilution in a suitable liquid, water being preferred in most cases, the surfaces of the material so treated are more easily given a uniform color effect.

By ozone as used herein is meant a gaseous matter containing a portion of oxygen in diatomic form and in admixture with oxygen in triatomic form. It may be produced for example by passing air with its oxygen content through an electrical zone containing a brush discharge. The superoxidation is evidently at a potential in excess of that obtainable with atmospheric oxygen and without secondary reaction forming by-products residual to the process.

The invention may be carried out in an apparatus that is suitable for bringing the ozone into contact with the porous material. An illustration of an arrangement of apparatus for carrying out the invention is shown somewhat diagrammatically in Fig. 1 and a modification is shown in vertical section in Fig. 2.

In the drawing reference character 1 indicates a container in which ozone is applied to the material. This container should be made of nickel or nickel alloy or other non-corrosive material or should be lined on the inside therewith, so that the material that is being treated will not be streaked or spotted by reason of the corrosive effect of ozone upon metallic substances. In this illustration the material is represented as being skeins 2 suspended from cross-pieces 3 so as to be below the surface of the liquid in the container 1. An over-flow 4 is shown at the upper edge of the container from which a return pipe 5 leads to a pump 6. A pipe 7 leads from the outlet side of the pump 6 into the lower portion of the container 1 and is provided with perforations 8 inside of the container. A pipe 9 leads from a supply 10 of color or dye to the inlet of the pump 6. An injector or aspirator 11 is located in the pipe 7 and a pipe 12 from an ozone generator 13 leads to the aspirator or injector 11. An air inlet pipe 14 is shown on one side of the ozone generator 13.

In the modification shown in Fig. 2 a closed container 15 has an inlet 16 for ozone on one side and an outlet 17 on the other side. Provision is also made in the container to prevent corrosion. The container 15 is provided with a fan 18 in the upper portion to keep the air containing ozone in circulation inside of the container. A series of staggered rollers 19 may be provided inside of the container over which rollers the cloth, for example, to be treated with ozone is caused to pass, the cloth being unwound from the roller 20 and wound upon the roller 21 or vice versa in a convenient way. The cloth may be dyed before it is passed through the container 15 where it undergoes treatment by contact with the ozone.

After the cloth has been dyed it may be dried in any of the well known ways.

I claim:—

1. The process of coloring porous material which comprises applying a color to a portion of the surface thereof, and subsequently altering organic matter deposited on controlled portions of the surface of said material by application thereto of a fluid containing ozone and in a concentration of about one part in two millions.

2. The process of coloring porous material comprising applying color to a portion of the surface thereof and subsequently altering organic matter deposited on controlled portions of the surface of said material by application of ozone thereto in a concentration of about one part in two millions while maintaining a temperature of about 170° F.

3. The process of applying color to cotton goods which comprises submerging said goods in water, maintaining the temperature at about 170° F. for a period of about thirty minutes, passing ozone containing air into contact with said water, so abstracting ozone from said air and passing the absorbed-ozone-containing water into moving contact with said goods and applying a dyestuff to said goods within a period of an hour after treatment with absorbed ozone-containing water.

4. The process of applying color to cotton goods which comprises submerging said goods in water, maintaining the temperature at about 170° F. for a period of about thirty minutes, passing ozone containing air into contact with said water, so abstracting ozone from said air and passing the absorbed-ozone-containing water into moving contact with said goods and applying a dyestuff to said goods within a period of an hour after treatment with absorbed-ozone-containing water and subsequently applying ozone to water and contacting the so treated water with the goods.

5. The process of applying color to cotton goods which comprises submerging said goods in water, maintaining the temperature at about 170° F. for a period of about thirty minutes, passing ozone containing air into contact with said water, so abstracting ozone from said air and passing the absorbed-ozone-containing water into moving contact with said goods and applying a dyestuff to said goods within a period of an hour after treatment with absorbed-ozone-containing water and maintaining motion of the goods in a manner to cause flexure of the fibres during substantial portions of said treatment.

6. The process which comprises applying a color to cotton goods and subsequently contacting said goods with water nearly saturated with ozone at about 170° F. and flexing the fibres of said goods and so brightening the applied color.

7. The process which comprises applying aqueous ozone of a concentration of about one part in two millions to color which has been applied to a portion of the surface of porous material in a manner to substantially reduce the emission of odor from the colored surface and substantially as described.

8. The process which comprises applying ozone in a carrying fluid of a concentration of about one part in two millions to color which has been applied to a portion of the surface of porous material held at about 170° F. and which color is associated with an odoriferous oil at the time of application of the ozone and so rendering the oil substantially free from odor.

9. The process which comprises applying a color to a portion of the surface of porous material, and subsequently altering organic matter deposited on defined portions of the surface of said material by passing freshly ozonated air into contact with the material at between about 135° F. and 185° F. and causing flexure of the material while it is contacted with the ozonated air.

10. The process which comprises passing air through an ozone generator, bubbling the ozonated air through water containing suspended porous material with dyed surface containing organic impurity and held at a temperature between about 135° F. and about 185° F. and so altering a portion of the organic impurity to improve the appearance of the dyed surface.

11. The process which comprises passing air through an ozone generator, bubbling the ozonated air through water containing suspended porous material with dyed surface containing organic impurity and held at a temperature between about 135° F. and about 185° F. and so altering a portion of the organic impurity to improve the appearance of the dyed surface substantially as described and subsequently applying color of high dilution in water to the surfaces so treated.

12. The process which comprises passing air through an ozone generator, contacting the ozonated air with water at 135° F. to 185° F., immediately applying the water to dyed cotton goods containing organic impurity during flexure thereof and forming a brightened surface of the dyed goods.

13. The process which comprises passing air through an ozone generator, bubbling the ozonated air through water containing an oleate at a temperature of between about 135° F. and 185° F., contacting the water simultaneously with fabric suspended therein and applying a dilute dye to the fabric quickly thereafter to form a light level tint.

14. The process which comprises passing air through an ozone generator and into contact with cotton goods contained in water at about 170° F. for a period of about thirty minutes while flexing the goods and applying a color diluted with water at about 80° F. and so producing a light level tint of the color.

15. The process which comprises passing air through an ozone generator and into contact with cotton goods contained in water at about 170° F. for a period of about thirty minutes while flexing the goods and applying a color of phenylmethane form containing two phenyl groups to a methane group diluted with water at about 80° F. and so producing a light level tint of the color.

16. The process of coloring comprising treating a fabric in water continuously contacted with ozonated air and held at between about 135° F. and 185° F. in a manner to flex the fibres of the fabric and applying a dilute color thereto within less than an hour after treatment with ozonated air and water and so producing a light tint which is substantially level.

17. The process which comprises coloring controlled portions of cotton goods deeply with an organic dyestuff leaving other controlled portions substantially white, surrounding the goods with water held at about 170° F. and treating the water with ozonated air, flexing the fibres of the goods, so promoting controlled ozonation of the goods and brightening the colored portions, applying a color diluted in water at about 80° F. soon after ozonation of the goods and so forming a light level tint on the substantially white portion and increased pleasing contrast between the deeply colored portions and the nearly white portions.

18. The process which comprises passing air through an ozone generator and into contact with cotton goods contained in water held at about 170° F. for a short period while flexing the goods and applying commercially produced acid fast violet diluted with water at about 80° F. and so producing a light level tint of the color.

19. The process which comprises passing air through an ozone generator and into contact with cotton goods contained in water at about 170° F. for a period of less than about thirty minutes while flexing the goods and applying triphenylmethane color diluted with water and at about 80° F. and so producing a light level tint of the color.

20. In the process of producing a light level tint on cotton goods, the steps which comprise suspending the goods in the water held at about 170° F. for a short period while flowing ozonated air into contact with the water and the goods and causing flexure of the goods and subsequently applying a dyestuff not normally considered as having affinity for cotton goods so treated and so adhering small portions of the dyestuff to the goods and coloring the same a light tint.

JUSTIN F. WAIT.